US012763412B2

(12) United States Patent
Feng

(10) Patent No.: US 12,763,412 B2
(45) Date of Patent: Oct. 13, 2026

(54) ELECTROCHEMICAL DEVICE AND ELECTRONIC DEVICE

(71) Applicant: Ningde Amperex Technology Limited, Ningde City (CN)

(72) Inventor: Qin Feng, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 213 days.

(21) Appl. No.: 17/706,241

(22) Filed: Mar. 28, 2022

(65) Prior Publication Data

US 2022/0320649 A1 Oct. 6, 2022

(30) Foreign Application Priority Data

Mar. 30, 2021 (CN) ........................ 202110341771.7

(51) Int. Cl.
*H01M 10/00* (2006.01)
*H01M 50/186* (2021.01)
(Continued)

(52) U.S. Cl.
CPC ....... *H01M 50/186* (2021.01); *H01M 50/193* (2021.01); *H01M 50/197* (2021.01); *H01M 50/531* (2021.01); *H01G 11/80* (2013.01)

(58) Field of Classification Search
CPC ............. H01M 50/186; H01M 50/193; H01M 50/197; H01M 50/531; H01M 50/124;
(Continued)

(56) References Cited

U.S. PATENT DOCUMENTS 6,689,177 B2 * 2/2004 Sugiyama ......... H01M 10/0525 429/185
11,177,541 B2 * 11/2021 Xiao .................. H01M 50/121
(Continued)

FOREIGN PATENT DOCUMENTS

CN 103280597 A 9/2013
CN 104969378 A 10/2015
(Continued)

OTHER PUBLICATIONS

First Office Action of CN application No. 202110341771.7, dated Mar. 29, 2023.

(Continued)

*Primary Examiner* — Nicholas P D'Aniello
(74) *Attorney, Agent, or Firm* — XSENSUS LLP

(57) ABSTRACT

An electrochemical device includes an electrode assembly, a housing, a sealing member, and a tab. The housing includes a main body portion and a sealing portion. At least a portion of the sealing member is disposed in the sealing portion, and the sealing member includes a first sealing member and a second sealing member. The tab protrudes from the sealing portion and is arranged between the first sealing member and the second sealing member. The first sealing member includes a first sealing layer and a second sealing layer disposed on the first sealing layer, and the first sealing layer is located between the tab and the second sealing layer. A melting point of the first sealing layer is lower than that of the second sealing layer, and a difference in the melting point between the first sealing layer and the second sealing layer is 35° C. to 50° C.

19 Claims, 2 Drawing Sheets

(51) Int. Cl.

| | |
|---|---|
| ***H01M 50/193*** | (2021.01) |
| ***H01M 50/197*** | (2021.01) |
| ***H01M 50/531*** | (2021.01) |
| *H01G 11/80* | (2013.01) |

(58) Field of Classification Search

CPC ........... H01M 50/143; H01M 10/0525; H01M 50/198; H01M 50/528; H01G 11/80; B32B 27/08; B32B 27/32

See application file for complete search history.

(56) References Cited

U.S. PATENT DOCUMENTS

| | | | | |
|---|---|---|---|---|
| 2003/0148173 | A1* | 8/2003 | Gu ...................... | H01M 50/193 429/185 |
| 2015/0147629 | A1* | 5/2015 | Kim .................. | H01M 10/4235 429/246 |
| 2015/0372263 | A1 | 12/2015 | Douke et al. | |
| 2019/0123312 | A1 | 4/2019 | Imamoto et al. | |
| 2021/0091435 | A1* | 3/2021 | Muraki ............... | H01M 50/557 |

FOREIGN PATENT DOCUMENTS

| | | | |
|---|---|---|---|
| CN | 105958135 | A | 9/2016 |
| CN | 106042566 | A | 10/2016 |
| CN | 107887562 | A | 4/2018 |
| CN | 211828842 | U | 10/2020 |
| EP | 2629348 | A1 | 8/2013 |
| EP | 3660941 | A1 | 6/2020 |
| JP | 2001297748 | A | 10/2001 |
| WO | 2019021997 | A1 | 1/2019 |

OTHER PUBLICATIONS

Extended European Search Report and Search Opinion for EP application No. 22164785.2, dated Sep. 30, 2022.

Third Party Observation for application No. EP20220164785 submitted on Apr. 29, 2024, along with JP2001297748A and its English Translation (D2 document), total 35 pages.

* cited by examiner

ELECTROCHEMICAL DEVICE AND ELECTRONIC DEVICE

CROSS-REFERENCE TO RELATED APPLICATIONS

This application claims the benefit of priority from the Chinese Patent Application No. 202110341771.7, filed on Mar. 30, 2021, which is incorporated herein by reference in its entirety.

TECHNICAL FIELD

The present application relates to an electrochemical device and an electronic device having the electrochemical device.

BACKGROUND

Electrochemical devices (such as batteries) are widely used in electronic devices such as electronic mobile devices, electric tools and electric vehicles, and people have higher and higher requirements for the safety performance of electrochemical devices. During, charging or use of electronic devices, a large amount of heat may be generated inside the electrochemical device. If the heat is difficult to dissipate in a short period of time, it is easy to cause thermal runaway of the electrochemical device and reduce its use safety.

SUMMARY

In view of this, the present application provides an electrochemical device that is beneficial to improve heat dissipation performance and use safety.

An embodiment of the present application provides an electrochemical device which comprises an electrode assembly, a housing, a sealing member, and a tab. The housing comprises a main body portion for accommodating the electrode assembly and a sealing portion connected to the main body portion. At least a portion of the sealing member is disposed in the sealing portion, and the sealing member comprises a first sealing member and a second sealing member. The tab is electrically connected to the electrode assembly and protrudes from the sealing portion, and the tab is arranged between the first sealing member and the second sealing member. The first sealing member comprises a first sealing layer and a second sealing layer disposed on the first sealing layer, and the first sealing layer is located between the tab and the second sealing layer. The melting point of the first sealing layer is lower than that of the second sealing layer, and the difference in the melting point between the first sealing layer and the second sealing layer is 35° C. to 50° C.

In the embodiment of the present application, the melting point of the first sealing layer is set to be lower than that of the second sealing layer, and the difference in the melting, point between the first sealing layer and the second sealing layer is 35° C. to 50° C. Therefore, when the internal temperature of the electrochemical device increases, the first sealing layer is incited, so that an adhesive force between the first sealing layer and the tab is less than that between the second sealing layer and the housing, thereby the adhesive surface between the first sealing layer and the tab is impacted and peeled off by the gas inside the electrochemical device, and the heat inside the electrochemical device being released so as to improve the use safety of the electrochemical device.

In some possible embodiments, the first sealing layer has a melting point of 110° C. to 120° C., and the second sealing layer has a melting point of 150° C. to 160° C.

In some possible embodiments, the first sealing layer is adhered to the tab, and the second sealing layer is adhered to the housing. When the temperature of the electrochemical device is neater than a preset value, the adhesive force between the first sealing layer and the tab is less than that between the second sealing layer and the housing, so that the adhesive surface between the first sealing layer and the tab is impacted and peeled off by the gas inside the electrochemical device, and thus the heat inside the electrochemical device is released to improve the use safety of the electrochemical device.

In some possible embodiments, the first sealing layer has a thickness of 2 μm to 40 μm and the second sealing layer has a thickness of 40 μm to 78 μm along the thickness direction of the electrochemical device.

In some possible embodiments, the first sealing member further comprises a third sealing laver, and the third sealing layer is located between the tab and the first sealing layer and is adhered to the tab, the second sealing layer is adhered to the housing, and when the temperature of the electrochemical device is greater than a preset value, the adhesive force between the first sealing layer and the third sealing layer is less than that between the second sealing layer and the housing, so that the adhesive surface between the first sealing layer and the third sealing layer is impacted and peeled off by the gas inside the electrochemical device, and thus the heat inside the electrochemical device is released to improve the use safety of the electrochemical device.

In some possible embodiments, the difference in the melting point between the first sealing layer and the third sealing layer is 35° C. to 50° C. Therefore, when the internal temperature of the electrochemical device increases, the first sealing layer is melted, so that the adhesive force between the first sealing layer and the third sealing layer is less than that between the second sealing layer and the housing, and thus the adhesive surface between the first sealing layer and the third sealing layer is impacted and peeled off by the gas inside the electrochemical device, leading to the heat inside the electrochemical device being released to improve the use safety of the electrochemical device In some possible embodiments, the third sealing layer has a melting point of 150° C. to 160° C.

In some possible embodiments, the difference in the melting point between the second sealing layer and the third sealing layer is 0° C. to 20° C.

In some possible embodiments, when the electrochemical device has a temperature of greater than 110° C. and less than or equal to 140° C. an adhesive force between the first sealing, layer and the tab or between the third sealing layer and the first sealing layer decreases by 1 N/6 mm to 2 N/6 mm.

In some possible embodiments, when the electrochemical device has a temperature of greater than 110° C. and less than or equal to 120° C. an adhesive force between the first sealing, layer and the tab or between the third sealing layer and the first sealing layer is greater than 0 and less than or equal to 0.7 N/mm.

In some possible embodiments, the first sealing layer has a thickness of 2 μm to 26 μm and the second sealing layer has a thickness of 27 μm to 39 μm and the third sealing layer has a thickness of 27 μm to 39 μm along the thickness direction of the electrochemical device.

In some possible embodiments, all the materials of the first sealing layer, the second sealing layer and the third sealing layer are at least one of polyethylene, polypropylene and polyurethane.

Another embodiment of the present application further provides an electronic devices comprising any one of the above-mentioned electrochemical devices.

In an embodiment of the present application, the melting point of the first sealing layer of the sealing member is set to be lower than that of the second sealing layer, and the difference in the melting point between the first sealing layer and the second sealing layer is 35° C. to 50° C. Therefore, when the internal temperature of the electrochemical device increases, the first sealing layer is melted, so that the adhesive force between the first sealing layer and the tab is less than that between the second sealing layer and the housing, and thus the adhesive surface between the first sealing layer and the tab is impacted and peeled off by the gas inside the electrochemical device, thereby the heat inside the electrochemical device being released to improve the use safety of the electrochemical device.

DESCRIPTION OF MAIN ELEMENT SYMBOLS

| | |
|---|---|
| Electrochemical device | 100 |
| Housing | 10 |
| Main body portion | 101 |
| Sealing portion | 102 |
| Sealing member | 20 |
| First sealing member | 21 |
| First sealing layer | 211 |
| Second sealing layer | 212 |
| Third sealing layer | 213 |
| Second sealing member | 22 |
| Tab | 30 |
| Electronic device | 200 |

The following specific embodiments will further illustrate the present application in conjunction with the above-mentioned drawings.

DETAILED DESCRIPTION

The technical solutions in the embodiments of the present application will be clearly and completely described below with reference to the drawings in the embodiments of the present application. Obviously, the described embodiments are merely a part but not all of the embodiments of the present application Unless otherwise defined, all technical and scientific terms used herein have the same meanings as commonly understood by those skilled in the technical field to Which this application belongs. The terms used herein in the specification of the application are merely for the purpose of describing specific embodiments, and are not intended to limit the application.

In order to further illustrate, the technical means and effects used by the present application to achieve the predetermined purpose, the following detailed description of the present application is made with reference to the accompanying drawings and preferred embodiments.

Figure 1:
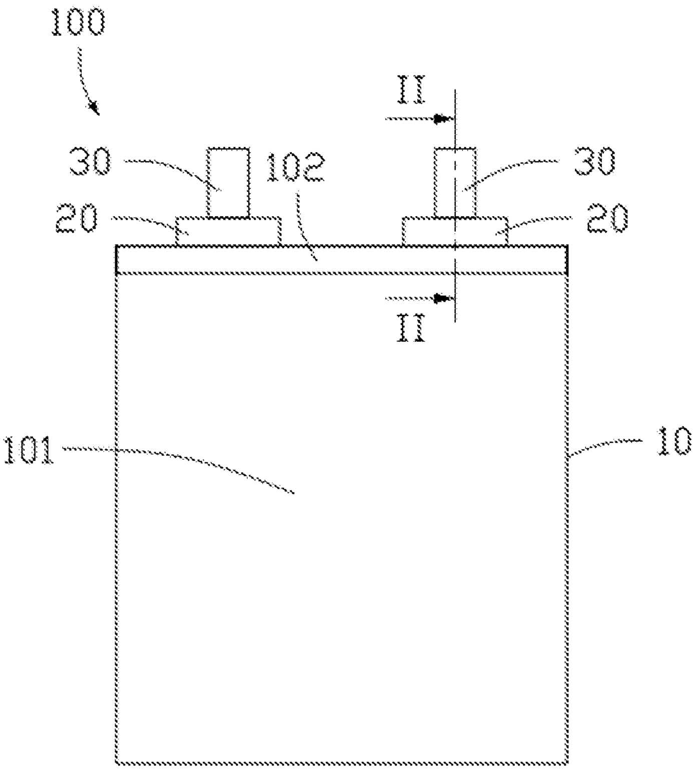
FIG. 1 is a schematic diagram of the overall structure of an electrochemical device provided by an embodiment of the present application.

Referring to FIG. 1, an embodiment of the present application provides an electrochemical device 100, which comprises an electrode assembly (not shown), a housing 10, a sealing member 20 and a tab 30.

The electrode assembly comprises a first electrode piece, a second electrode piece and a separator, and the separator is arranged between the first electrode piece and the second electrode piece. The separator is used to prevent the first electrode piece and the second electrode piece from being in direct contact, thereby preventing the electrode assembly from short-circuiting. In some embodiments, the electrode assembly is a wound structure, that is, the first electrode piece, the separator and the second electrode piece are laminated in order and wound to form the electrode assembly. In other embodiments, the electrode assembly may also be a laminated structure, that is, the first electrode piece, the separator and the second electrode piece are laminated in order to form the electrode assembly, which is not limited in the application.

The housing. 10 comprises a main body portion 101 for accommodating the electrode assembly, and a sealing portion 102 connected to the main body portion 101. In some embodiments, the housing 10 may be a packaging bag packaged with a packaging film (e.g., aluminum-plastic film), that is, the electrochemical device 100 may be a soft-packed cell.

Figure 2:
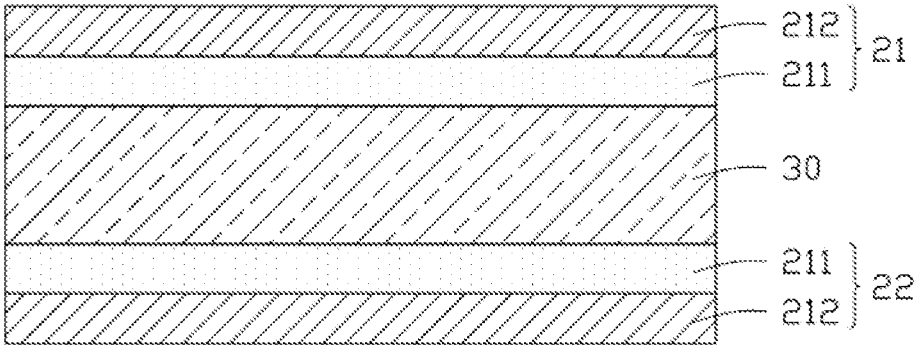
FIG. 2 is a cross-sectional view along II-II of the electrochemical device as shown in FIG. 1 in some embodiments.

Also referring to FIG. 2, at least part of the sealing member 20 is disposed in the sealing portion 102. The sealing member 20 comprises a first sealing member 21 and a second sealing member 22.

In some embodiments, the first sealing member 21 comprises a first sealing layer 211 and a second sealing layer 212 disposed on the first sealing layer 211. The first sealing layer 211 is located between the tab 30 and the second sealing, layer 212. The first sealing layer 211 is used to adhere to the tab 30, and the second sealing layer 212 is used to adhere to the housing 10. The melting point of the first sealing layer 211 is lower than that of the second sealing layer 212, and the difference in the melting point between the first sealing layer 211 and the second sealing layer 212 is 35° C. to 50° C. Therefore, when the internal temperature of the electrochemical device 100 increases, the first sealing layer 211 is melted, so that the adhesive force between the first sealing layer 211 and the tab 30 is less than that between the second sealing layer 212 and the housing 10 and thus the adhesive surface between the first sealing layer 211 and the tab 30 is impacted and peeled off by the gas inside the electrochemical device 100, leading to the heat inside the electrochemical device 100 being released to improve the use safety of the electrochemical device 100. In some embodiments, the first sealing, layer 211 has a melting point of 110° C. to 120° C., and the second sealing layer 212 has a melting point of 150° C. to 160° C. The melting point of each sealing layer can be obtained by using some existing test methods, such as DSC curve and so on.

Among them, when the temperature of the electrochemical device 100 is greater than the preset value, the first sealing layer 211 is melted. In some embodiments, the preset value may be 110° C. In other embodiments, the preset value may also be other temperatures, such as 120° C.

In some embodiments, the first sealing layer 211 has a thickness of 2 μm to 40 μm and the second sealing layer 212 has a thickness of 40 μm to 78 μm along the thickness direction of the electrochemical device 100. Both the materials of the first sealing layer 211 and the second sealing layer 212 are at least one of polyethylene, polypropylene and polyurethane.

Figure 3:
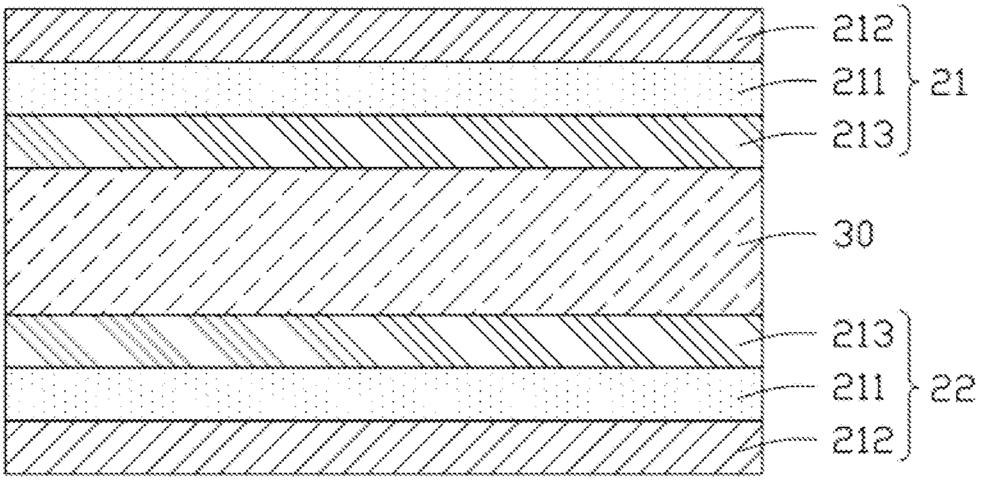
FIG. 3 is a cross-sectional view along of the electrochemical device as Shown in FIG. 1 in other embodiments.

Referring to FIG. 3, in other embodiments, the first sealing member 21 further comprises a third sealing layer 213. The third sealing layer 213 is located between the tab 30 and the first sealing layer 211 and is adhered to the tab 30, and the second sealing layer 212 is adhered to the housing 10. The difference in the melting point between the first sealing layer 211 and the third sealing layer 213 is 35° C. to 50° C., and that between the second sealing layer 212 and the third sealing layer 213 is 0° C. to 20° C. Therefore, when the internal temperature of the electrochemical device 100 increases, the first sealing layer 211 is melted, so that the adhesive force between the first sealing layer 211 and the third sealing layer 213 is less than that between the second sealing layer 212 and the housing 10, and thus the adhesive surface between the first sealing layer 211 and the third sealing layer 213 is impacted and peeled off by the gas inside the electrochemical device 100, leading to the heat inside the electrochemical device 100 being released to improve the use safety of the electrochemical device 100. In some embodiments, the third sealing layer 213 has a melting point of 150° C. to 160° C.

In some embodiments, the first sealing layer 211 has a thickness of 2 μm to 2.6 μm, the second sealing layer 213 has a thickness of 27 μm to 39 μm, and the third sealing layer 213 has a thickness of 27 μm to 39 μm along the thickness direction of the electrochemical device 100. The material of the third sealing layer 213 is at least one of polyethylene, polypropylene and polyurethane.

In some embodiments, when the temperature of the electrochemical device 100 is greater than 110° C. and less than or equal to 140° C., an adhesive force between the first sealing layer 211 and the tab 30 or between the third sealing layer 213 and the first sealing layer 211 decreases by 1 N/6 mm to 2 N/6 mm. Among them, 0.6 mm means that the packaged sample is subsequently cut into samples to be tested with a width of 6 mm for testing.

In some embodiments, when the temperature of the electrochemical device 100 is greater than 110° C. and less than or equal to 120° C., an adhesive force between the first sealing layer 211 and the tab 30 or between the third sealing layer 213 and the first sealing layer 211 is greater than 0 and less than or equal to 0.7 N/mm.

Referring to FIG. 3, in the thickness direction of the electrode assembly, the second sealing member 22 and the first sealing member 21 are located on two sides of the tab 30 respectively and the second sealing member 22 and the first sealing member 21 is adhered to each other. The second sealing, member 22 has the same structure and properties as the first sealing member 21. Specifically, in some embodiments, the second sealing member 22 comprises a first sealing layer 211 and a second sealing layer 212 disposed on the first sealing layer 211. In other embodiments, the second sealing member 22 further comprises a third sealing layer 213. The properties and arrangement positions of the second sealing member 22 will not be described in detail here. For details, reference may be made to the first sealing member 21.

Referring to FIG. 1, the tab 30 is electrically connected to the electrode assembly and protrudes from the sealing portion 102, and the tab 30 is disposed between the first sealing member 21 and the second sealing member 22. The number of tabs 30 is two, one of which is an anode tab and the other is a cathode tab. The tabs 30 are used for electrical connection with external elements (not shown).

Figure 4:
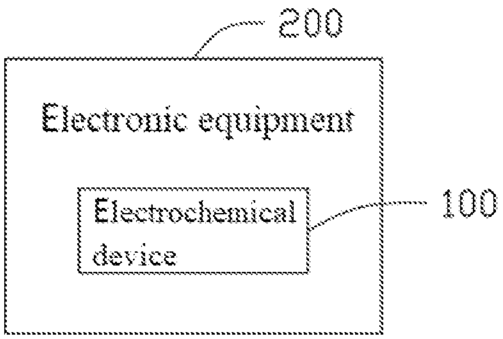
FIG. 4 is a block diagram of the electronic device according to an embodiment of the present application.

Referring to FIG. 4, another embodiment of the present application further provides an electronic device 200. The electronic device 200 comprises any one of the electrochemical device 100 described above. The electronic device 200 in this embodiment of the present application may be, but is not limited to, a notebook computer, a pen input computer, a mobile computer, an e-book player, a portable phone, a portable fax machine, a portable copier, a portable printer, a head-worn stereo headset, VCRs, LCD TVs, portable cleaners, portable CI) players, mini discs, transceivers, electronic notepads, calculators, memory cards, portable recorders, radios, backup power supplies, motors, automobiles, motorcycles, assisted bicycles, bicycles, lighting device, toys, game consoles, clocks, electric tools, flashlights, cameras, large-scale household storage batteries and lithium-ion capacitors, etc.

The present application will be further described below through examples and comparative examples. Among them, taking the electrochemical device as a lithium cobaltate/graphite battery as an example, the present application will be described in conjunction with the specific preparation process and test method. Those skilled in the art Should understand that the preparation method described in the present application is only an example, and any other suitable preparation methods are all within the scope of this application Example 1

The first sealing member in the battery comprised a first sealing layer and a second sealing layer disposed on the first sealing layer, the first sealing layer was located between the tab and the second sealing layer, and the first sealing layer was adhered to the tab, the second sealing layer was adhered to the housing. Among them, the first sealing layer was made of a mixed material of polyethylene and polypropylene, the first sealing layer had a melting point of 120° C., and the first sealing layer had a thickness of 2 μm; and the second sealing layer was made of polyethylene, the second sealing layer had a melting point of 160° C., and the second sealing layer had a thickness of 78 μm; and the tab had a thickness of 80 μm.

Example 2

The difference from Example 1 was that the first sealing layer had a melting point of 110° C. and the second sealing layer had a melting point of 150° C.

Example 3

The difference from Example 1 was that the first sealing layer had a thickness of 40 μm and the second sealing layer had a thickness of 40 μm.

Example 4

The difference from Example 1 was that the first sealing layer had a melting point of 110° C., the first sealing layer had a thickness of 40 μm, the second sealing layer had a melting point of 150° C., and the second sealing layer had a thickness of 40 μm.

Example 5

The difference from Example 1 was that the first sealing member further comprised a third sealing layer, the third sealing layer was located between the tab and the first sealing layer and was adhered to the tab, wherein the second sealing layer had a thickness of 76 μm, the third sealing layer was made of polyethylene, the third sealing layer had a melting point of 160° C., and the third sealing layer had a thickness of 76 μm.

Example 6

The difference from Example 1 was that the first sealing layer had a thickness of 26 μm and the second sealing layer had a thickness of 28 μm.

Example 7

The difference from Example 1 was that the first sealing layer had a melting point of 110° C., the second sealing layer had a melting point of 150° C., and the second sealing layer had a thickness of 76 μm.

Example 8

The difference from Example 1 was that the first sealing layer had a melting point of 110° C., the first sealing layer had a thickness of 26 μm, the second sealing layer had a melting, point of 150° C., and the second sealing, layer had a thickness of 28 μm.

Comparative Example 1

The difference from Example 1 was that the first sealing member did not comprise the first sealing layer, the second sealing layer was adhered to the tab and the housing, and the second sealing layer had a thickness of 80 μm.

Comparative Example 2

The difference from Example 1 was that the first sealing member did not comprise the first sealing layer, the second sealing layer was adhered to the tab and the housing, the second sealing layer had a melting point of 150° C., and the second sealing layer had a thickness of 28 μm.

The packaging tensile force (i.e., the adhesive force) test was carried out on the batteries in each of examples and the comparative examples, and the corresponding packaging tensile force test results were recorded in Table 1. Among them, the specific method of the encapsulation tensile test was: the sealing portion at the tabs in the battery was cut into a sample to be tested with a width of 6 mm, the sample to be tested was clamped on a high-speed rail tensile machine, setting at the ambient temperature, and heating up to a predetermined temperature of 110° C. Thereafter, the temperature was kept for 5 min, the peel force at 180° was tested, and the tensile speed was 175±5 mm/min.

A hot box test was performed on the batteries in each of examples and the comparative examples, and 20 batteries from each group of the example and the comparative example were taken for testing. Then, the proportions of the batteries from each group of the example and the comparative example passing the test were counted, and the results were recorded in Table 1. Among them, the specific method of the hot box test was: the battery was placed in a hot box at a temperature of 125° C. and 130° C., and the temperature was kept for 60 minutes to observe the state of the battery. The criterion for judgement: the battery was deemed to pass the test if it did not catch fire, burn and explode. Among them, 20/20 pass meant: among the 20 batteries that had been tested, the number of batteries that had passed the test was 20; and 18/20 pass meant: among the 20 batteries that had been tested, the number of batteries that had passed the test was 18. The meanings of other ratio values were analogous.

TABLE 1

| | Packaging tensile force (N/mm) | Hot box at 125° C. | Hot box at 130° C. |
|---|---|---|---|
| Ex. 1 | 0.7 | 20/20pass | 18/20pass |
| Ex. 2 | 0.1 | 20/20pass | 20/20pass |
| Ex. 3 | 0.65 | 20/20pass | 16/20pass |
| Ex. 4 | 0.13 | 20/20pass | 15/20pass |
| Ex. 5 | 0.65 | 20/20pass | 20/20pass |
| Ex. 6 | 0.43 | 20/20pass | 20/20pass |
| Ex. 7 | 0.2 | 20/20pass | 19/20pass |
| Ex. 8 | 0.16 | 20/20pass | 18/20pass |
| Com. Ex. 1 | 4 | 10/20pass | 0/20pass |
| Com. Ex. 2 | 3 | 14/20pass | 1/20pass |

It can be seen from the data in Table 1 that, compared to Comparative Example 1-2, the packaging tensile force of the batteries in Examples 1-8 (that is, the adhesive force between the first sealing layer and the tab or between the first sealing layer and the third sealing layer) is small, indicating that the first sealing layer is melted as the temperature of the batteries in Examples 1-8 increases.

It can also be seen from the data in Table 1 that, compared to Comparative Example 1-2, most of the batteries in Example 1-8 do not catch fire, burn and explode at 125° C. and 130° C. Meanwhile, it can also be known that the thermal stability of the batteries in Examples 1-8 is significantly improved compared to that of the batteries in Comparative Example 1-2, indicating that the use safety of the batteries in Example 1-8 is significantly improved.

The above-mentioned description is only some specific embodiments of the present application, but it cannot be limited merely to this embodiment during the actual application. For those skilled in the art, other modifications and changes made according to the technical concept of the present application should all belong to the scope of the present application.

What is claimed is:

1. An electrochemical device, comprising:

an electrode assembly;

a housing comprising a main body portion for accommodating the electrode assembly and a sealing portion connected to the main body portion;

a tab electrically connected to the electrode assembly and protruding from the sealing portion; and a sealing member, disposed between the tab and the sealing portion, to seal the tab with the housing, wherein at least a portion of the sealing member is disposed in the sealing portion, the sealing member comprises a first sealing member and a second sealing member, and the tab is arranged between the first sealing member and the second sealing member, each of the first sealing member and the second sealing member comprises a first sealing layer, a second sealing layer, and a third sealing layer, the third sealing layer is located between the tab and the first sealing layer and is adhered to the tab, the first sealing layer is disposed on the third sealing layer, and the second sealing layer is disposed on the first sealing layer and is adhered to the sealing portion, and a melting point of the first sealing layer is lower than a melting point of the second sealing layer or a melting point of the third sealing layer, and a difference in the melting point between the first sealing layer and the second sealing layer is 35° C. to 50° C., and a difference in the melting point between the first sealing layer and the third sealing layer is 35° C. to 50° C.

2. The electrochemical device of claim 1, wherein the first sealing layer has a melting point of 110° C. to 120° C., and the second sealing layer has a melting point of 150° C. to 160° C.

3. The electrochemical device of claim 1, wherein along the thickness direction of the electrochemical device, the first sealing layer has a thickness of 2 μm to 40 μm, and the second sealing layer has a thickness of 40 μm to 78 μm.

4. The electrochemical device of claim 1, wherein when a temperature of the electrochemical device is greater than a preset value, an adhesive force between the first sealing layer and the third sealing layer is less than an adhesive force between the second sealing layer and the sealing portion.

5. The electrochemical device of claim 1, wherein the third sealing layer has a melting point of 150° C. to 160° C.

6. The electrochemical device of claim 1, wherein a difference in the melting point between the second sealing layer and the third sealing layer is 0° C. to 20° C.

7. The electrochemical device of claim 4, wherein when the electrochemical device has a temperature of greater than 110° C. and less than or equal to 140° C., an adhesive force between the first sealing layer and the tab or an adhesive force between the third sealing layer and the first sealing layer decreases by 1 N/6 mm to 2 N/6 mm.

8. The electrochemical device of claim 4, wherein when the electrochemical device has a temperature of greater than 110° C. and less than or equal to 120° C., an adhesive force between the first sealing layer and the tab or an adhesive force between the third sealing layer and the first sealing layer is greater than 0 and less than or equal to 0.7 N/mm.

9. The electrochemical device of claim 1, wherein along the thickness direction of the electrochemical device, the first sealing layer has a thickness of 2 μm to 26 μm, the second sealing layer has a thickness of 27 μm to 39 μm, and the third sealing layer has a thickness of 27 μm to 39 μm.

10. The electrochemical device of claim 1, wherein each of the first sealing layer, the second sealing layer and the third sealing layer is made of a material comprising at least one of polyethylene, polypropylene and polyurethane.

11. An electronic device, comprising an electrochemical device, the electrochemical device comprising:

an electrode assembly;

a housing comprising a main body portion for accommodating the electrode assembly and a sealing portion connected to the main body portion;

a tab electrically connected to the electrode assembly and protruding from the sealing portion; and a sealing member, disposed between the tab and the sealing portion, to seal the tab with the housing, wherein at least a portion of the sealing member is disposed in the sealing portion, the sealing member comprises a first sealing member and a second sealing member, and the tab is arranged between the first sealing member and the second sealing member, each of the first sealing member and the second sealing member comprises a first sealing layer, a second sealing layer, and a third sealing layer, the third sealing layer is located between the tab and the first sealing layer and is adhered to the tab, the first sealing layer is disposed on the third sealing layer, and the second sealing layer is disposed on the first sealing layer and is adhered to the sealing portion, and a melting point of the first sealing layer is lower than a melting point of the second sealing layer or a melting point of the third sealing layer, and a difference in the melting point between the first sealing layer and the second sealing layer is 35° C. to 50° C.° C., and a difference in the melting point between the first sealing layer and the third sealing layer is 35° C. to 50° C.

12. The electronic device of claim 11, wherein the first sealing layer has a melting point of 110° C. to 120° C., and the second sealing layer has a melting point of 150° C. to 160° C.

13. The electronic device of claim 11, wherein along the thickness direction of the electrochemical device, the first sealing layer has a thickness of 2 μm to 40 μm, and the second sealing layer has a thickness of 40 μm to 78 μm.

14. The electronic device of claim 11, wherein when a temperature of the electrochemical device is greater than a preset value, an adhesive force between the first sealing layer and the third sealing layer is less than an adhesive force between the second sealing layer and the sealing portion.

15. The electronic device of claim 11, wherein the third sealing layer has a melting point of 150° C. to 160° C.

16. The electronic device of claim 11, wherein a difference in the melting point between the second sealing layer and the third sealing layer is 0° C. to 20° C.

17. The electrochemical device of claim 1, wherein the main body portion encloses a space with an opening for accommodating the electrode assembly in the space and the sealing portion covers the opening of the main body portion, and the second sealing layer is adhered directly to the sealing portion.

18. The electrochemical device of claim 1, wherein the difference in the melting point between the first sealing layer and the second sealing layer is 40° C. to 50° C.; and the difference in the melting point between the first sealing layer and the third sealing layer is 40° C. to 50° C.

19. The electronic device of claim 11, wherein the main body portion encloses a space with an opening for accommodating the electrode assembly in the space and the sealing portion covers the opening of the main body portion, and the second sealing layer is adhered directly to the sealing portion.

* * * * *